US012687039B2

(12) United States Patent
Huang

(10) Patent No.: US 12,687,039 B2
(45) Date of Patent: Jul. 21, 2026

(54) HEAVY DUTY LOCK

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 423 days.

(21) Appl. No.: 18/532,681

(22) Filed: Dec. 7, 2023

(65) Prior Publication Data

US 2025/0163728 A1 May 22, 2025

(30) Foreign Application Priority Data

Nov. 22, 2023 (TW) ................................ 112145139

(51) Int. Cl.

*E05B 59/00* (2006.01)
*E05B 15/04* (2006.01)
*E05B 63/08* (2006.01)
*E05B 63/14* (2006.01)
*E05B 9/02* (2006.01)

(52) U.S. Cl.

CPC .............. *E05B 59/00* (2013.01); *E05B 15/04* (2013.01); *E05B 63/08* (2013.01); *E05B 63/14* (2013.01); *E05B 9/02* (2013.01); *E05B 2015/0413* (2013.01)

(58) Field of Classification Search

CPC .......... E05B 59/00; E05B 15/04; E05B 63/08; E05B 63/14; E05B 9/02; E05B 2015/0413

USPC ............................................................ 70/108

See application file for complete search history.

(56) References Cited

U.S. PATENT DOCUMENTS

| | | | |
|---|---|---|---|
| 1,643,932 | A | 9/1927 | Teich |
| 1,687,009 | A | 10/1928 | Drexler et al. |
| 2,820,241 | A | 1/1958 | Schlage |
| 4,102,005 | A | 7/1978 | Schnarr et al. |
| 4,107,877 | A | 8/1978 | Lee |
| 4,267,619 | A | 5/1981 | Suska |
| 4,348,835 | A | 9/1982 | Jones et al. |
| 4,419,787 | A | 12/1983 | Lieberman |

(Continued)

FOREIGN PATENT DOCUMENTS

| | | | |
|---|---|---|---|
| AU | 2014339759 B2 | 5/2018 | |
| DE | 102004034529 B3 * | 4/2006 | ............ E05B 63/20 |

(Continued)

*Primary Examiner* — Kristina R Fulton
*Assistant Examiner* — James Edward Ignaczewski
(74) *Attorney, Agent, or Firm* — Che-Yang Chen; Law Office of Michael Chen

(57) ABSTRACT

A heavy duty lock is mounted on a door and includes a latch, an anti-theft latch, and a stop-latch. When the door is in an open position, the stop-latch is in an extended position, such that the anti-theft latch cannot move toward an anti-theft position. When the door pivots to a closed position, the stop-latch moves to a retracted position, and the anti-theft control member moves to the anti-theft position. When the latch moves to an unlatching position through normal operation, the anti-theft control member moves to a non-anti-theft position. Thus, the anti-theft control member will be in the anti-theft position when the door is the closed position. When the door is opened through normal operation, the anti-theft control member will move to the non-anti-theft position.

12 Claims, 6 Drawing Sheets

(56) References Cited

U.S. PATENT DOCUMENTS 4,501,090 A 2/1985 Yoshida et al.
4,628,636 A 12/1986 Folger
4,867,496 A 9/1989 Thomas
5,040,331 A 8/1991 Merendino et al.
5,782,509 A 7/1998 Uyeda
6,177,771 B1 1/2001 Kinzer et al.
6,454,324 B1 9/2002 Lewis et al.
6,553,717 B2 4/2003 St. John et al.
6,622,535 B2 9/2003 Chiang et al.
6,634,140 B1 10/2003 Sellman
6,732,557 B1 5/2004 Zehrung
6,745,603 B1 6/2004 Shaw
6,786,006 B2 9/2004 Kowalczyk et al.
6,891,479 B1 5/2005 Eccleston
6,978,646 B2 12/2005 Raatikainen
6,993,946 B1 * 2/2006 Shen ........................ E05B 55/12 292/169.22
7,051,403 B2 5/2006 Homberg
7,061,197 B1 6/2006 Mullet et al.
7,068,179 B2 6/2006 Snell et al.
7,143,547 B2 12/2006 Liles, Jr.
7,234,201 B2 6/2007 Brown et al.
7,240,524 B1 7/2007 White et al.
7,282,883 B2 10/2007 Mullet et al.
7,296,380 B2 11/2007 Backman
7,316,096 B2 1/2008 Houser et al.
7,418,800 B1 9/2008 Sellman
7,484,333 B2 2/2009 Houser et al.
7,555,867 B2 7/2009 Liles, Jr.
7,717,155 B2 5/2010 Mullet
7,774,984 B2 8/2010 Hsu
7,966,771 B2 6/2011 Bienek
8,109,038 B2 2/2012 Houser et al.
8,169,169 B2 5/2012 Hass et al.
8,201,858 B1 6/2012 Moon et al.
8,225,458 B1 7/2012 Hoffberg
8,248,005 B2 8/2012 Romer
8,359,790 B2 1/2013 Shin
8,382,008 B1 2/2013 Ricciardi et al.
8,390,219 B2 3/2013 Houser
8,393,054 B2 3/2013 Bienek
8,407,937 B2 4/2013 Houser
8,415,902 B2 4/2013 Burris et al.
8,434,268 B2 5/2013 Nixon
8,499,495 B2 8/2013 Houser et al.
8,523,248 B2 9/2013 Tien
8,540,290 B2 9/2013 Chen
8,547,046 B2 10/2013 Burris et al.
8,601,744 B2 12/2013 Wildforster et al.
8,641,104 B1 * 2/2014 Tien ........................ E05B 63/16 292/244
8,695,277 B2 4/2014 Romer et al.
8,773,237 B2 7/2014 Burris et al.
8,826,598 B2 9/2014 Ranaudo et al.
8,875,344 B2 11/2014 Salutzki et al.
8,904,710 B2 12/2014 Romer et al.
8,963,683 B2 2/2015 Romer
9,003,630 B2 4/2015 Hufen
9,045,927 B1 6/2015 Hoffberg
9,097,051 B2 8/2015 Hellwig
9,115,526 B2 8/2015 Houser et al.
9,121,217 B1 9/2015 Hoffberg
9,163,446 B2 10/2015 Houser et al.
9,181,744 B2 11/2015 Salutzki et al.
9,187,942 B2 11/2015 Wildforster
9,297,194 B2 3/2016 Bienek et al.
9,506,284 B2 11/2016 Braverman et al.
9,514,583 B2 12/2016 Zasowski et al.
9,631,412 B2 4/2017 Hellwig et al.
9,683,378 B2 6/2017 Houser et al.
9,695,620 B2 7/2017 Zasowski et al.
9,830,932 B1 11/2017 Gunderson et al.
9,869,117 B2 1/2018 Houser et al.
9,886,831 B1 2/2018 Svoboda et al.
9,890,565 B2 * 2/2018 Shiu ........................ E05B 63/08
9,995,076 B1 6/2018 Hoffberg
10,006,236 B2 6/2018 Hellwig et al.
10,024,094 B2 7/2018 Bell et al.
10,030,425 B2 7/2018 Zasowski et al.
10,030,426 B2 7/2018 Langenberg
10,077,591 B2 9/2018 Hass
10,180,023 B2 1/2019 Zasowski et al.
10,208,520 B2 2/2019 Long et al.
10,236,801 B2 3/2019 Dye et al.
10,253,540 B2 4/2019 Bell et al.
10,273,736 B2 4/2019 Hucker
10,280,670 B2 5/2019 Roberts
10,280,678 B1 5/2019 Rendon, Jr. et al.
10,304,272 B2 5/2019 Kvinge et al.
10,316,568 B2 6/2019 Langenberg et al.
10,344,502 B2 7/2019 McKibben et al.
10,415,301 B2 9/2019 Kuan
10,458,151 B1 10/2019 Shen
10,472,873 B2 11/2019 Ladha et al.
10,480,238 B1 11/2019 La Force
10,559,151 B2 2/2020 Kvinge et al.
10,648,198 B1 5/2020 Shen
10,648,208 B2 5/2020 Eickhoff
10,704,310 B1 7/2020 Barbon et al.
10,704,313 B2 7/2020 Houser et al.
10,724,288 B2 7/2020 Baumgarte
10,844,644 B2 11/2020 Langenberg et al.
10,968,677 B2 4/2021 Hass
11,002,055 B2 5/2021 Eickhoff et al.
11,124,997 B2 9/2021 Eickhoff
11,187,022 B1 11/2021 Hoffberg
11,250,655 B2 2/2022 Shen
11,417,200 B2 8/2022 Hass et al.
11,542,727 B2 1/2023 Hsu
11,544,979 B1 1/2023 Shen
11,606,681 B2 3/2023 Shen
11,629,527 B2 4/2023 Hsu
11,629,544 B1 4/2023 Tien
11,631,292 B2 4/2023 Shen
11,661,782 B2 5/2023 Eickhoff et al.
11,727,770 B2 8/2023 Shen et al.
11,753,848 B2 9/2023 Tien
11,756,355 B2 9/2023 Shen
11,795,751 B2 10/2023 Tien
11,798,330 B2 10/2023 Shen
11,814,876 B2 11/2023 Huang
11,828,097 B1 11/2023 Tien
2002/0026750 A1 3/2002 St. John et al.
2002/0104339 A1 * 8/2002 Saner ...................... E05C 9/026 70/108
2002/0178655 A1 12/2002 Pedemonte
2003/0127869 A1 7/2003 Herron et al.
2003/0187805 A1 10/2003 Shen
2003/0204935 A1 11/2003 Kim
2005/0154612 A1 7/2005 Smith et al.
2006/0087125 A1 * 4/2006 Moon ..................... E05B 63/08 292/32
2006/0244271 A1 11/2006 Hass
2007/0022664 A1 2/2007 Mahonen et al.
2007/0114800 A1 5/2007 Kuo
2007/0256362 A1 11/2007 Hansen
2007/0268132 A1 11/2007 Milo
2008/0011030 A1 1/2008 Ferreira Sanchez et al.
2008/0087055 A1 * 4/2008 Chen ..................... E05B 13/004 70/107
2009/0265992 A1 10/2009 Hass et al.
2009/0314043 A1 * 12/2009 Tien .................... E05B 65/1086 70/156
2010/0107495 A1 5/2010 Bourgeois et al.
2010/0263418 A1 * 10/2010 Moon ..................... E05B 63/16 292/61
2010/0315229 A1 12/2010 Shin
2011/0094160 A1 4/2011 Houser
2011/0252597 A1 10/2011 Burris et al.
2011/0302841 A1 12/2011 Ye et al.
2012/0029701 A1 2/2012 Houser
2012/0159852 A1 6/2012 Houser et al.
2012/0190325 A1 7/2012 Abu-Hakima et al.
2013/0009785 A1 1/2013 Finn et al.

(56) References Cited

U.S. PATENT DOCUMENTS

| | | | |
|---|---|---|---|
| 2013/0216438 A1 | 8/2013 | Hill et al. | |
| 2013/0308778 A1 | 11/2013 | Fosmark et al. | |
| 2013/0346333 A1 | 12/2013 | Hassler et al. | |
| 2014/0026627 A1 | 1/2014 | Rai et al. | |
| 2014/0165329 A1 | 6/2014 | Wildförster | |
| 2014/0255252 A1 | 9/2014 | Stratman et al. | |
| 2014/0282934 A1 | 9/2014 | Miasnik et al. | |
| 2014/0325911 A1 | 11/2014 | Hass | |
| 2015/0070166 A1 | 3/2015 | Boyden et al. | |
| 2015/0113876 A1 | 4/2015 | Burris et al. | |
| 2015/0194033 A1 | 7/2015 | Esposito et al. | |
| 2015/0211278 A1 | 7/2015 | Moyer et al. | |
| 2015/0262438 A1 | 9/2015 | Zasowski et al. | |
| 2015/0339913 A1 | 11/2015 | Lyman et al. | |
| 2016/0220716 A1 | 8/2016 | Childress et al. | |
| 2016/0258189 A1 | 9/2016 | Frolov | |
| 2016/0281391 A1* | 9/2016 | Bartholdi | E05B 63/20 |
| 2016/0312514 A1 | 10/2016 | Leonard et al. | |
| 2016/0348415 A1 | 12/2016 | Baumgarte | |
| 2016/0368455 A1 | 12/2016 | Kim et al. | |
| 2017/0275912 A1 | 9/2017 | Murphy | |
| 2017/0275920 A1* | 9/2017 | Chen | E05B 17/22 |
| 2017/0275921 A1 | 9/2017 | Murphy et al. | |
| 2017/0306668 A1 | 10/2017 | Li et al. | |
| 2017/0328100 A1 | 11/2017 | Eickhoff | |
| 2018/0223577 A1 | 8/2018 | Hucker | |
| 2018/0320414 A1* | 11/2018 | Piantek | E05C 1/04 |
| 2018/0334841 A1 | 11/2018 | Langenberg et al. | |
| 2018/0334845 A1 | 11/2018 | Hass | |
| 2019/0043289 A1 | 2/2019 | Cahill | |
| 2019/0043296 A1 | 2/2019 | Baumgarte et al. | |
| 2019/0145138 A1 | 5/2019 | Eickhoff | |
| 2019/0153764 A1 | 5/2019 | Baumgarte | |
| 2019/0178007 A1* | 6/2019 | Palmieri | E05B 63/08 |
| 2019/0203503 A1 | 7/2019 | Chang | |
| 2019/0264486 A1 | 8/2019 | Toloday et al. | |
| 2019/0319557 A1 | 10/2019 | Dye et al. | |
| 2019/0338576 A1 | 11/2019 | Wang | |
| 2019/0345738 A1 | 11/2019 | McKibben et al. | |
| 2019/0376316 A1 | 12/2019 | Hsu | |
| 2019/0376317 A1 | 12/2019 | Hsu | |
| 2019/0383080 A1 | 12/2019 | Barbon et al. | |
| 2020/0037142 A1 | 1/2020 | Lofton | |
| 2020/0190885 A1 | 6/2020 | Coleman | |
| 2020/0211362 A1 | 7/2020 | Shen | |
| 2020/0256108 A1 | 8/2020 | Shetty et al. | |
| 2020/0327758 A1 | 10/2020 | Ma et al. | |
| 2020/0372743 A1 | 11/2020 | Miller et al. | |
| 2021/0011443 A1 | 1/2021 | Mcnamara et al. | |
| 2021/0012598 A1 | 1/2021 | Giebat et al. | |
| 2021/0023248 A1 | 1/2021 | Townsend et al. | |
| 2021/0056791 A1 | 2/2021 | Shen | |
| 2021/0123287 A1 | 4/2021 | Miller et al. | |
| 2021/0134096 A1 | 5/2021 | Pukari | |
| 2021/0217260 A1 | 7/2021 | Chen | |
| 2021/0252179 A1 | 8/2021 | Grinstead et al. | |
| 2021/0308311 A1 | 10/2021 | Stewart et al. | |
| 2022/0148393 A1 | 5/2022 | Shen et al. | |
| 2022/0307316 A1 | 9/2022 | Soderqvist | |
| 2023/0104006 A1 | 4/2023 | Tien | |
| 2023/0133080 A1 | 5/2023 | Tien | |

FOREIGN PATENT DOCUMENTS

| | | | | |
|---|---|---|---|---|
| DE | 102005040744 A1 * | 3/2007 | E05B 59/00 |
| DE | 102016202225 A1 | 8/2017 | |
| DE | 102017209467 A1 | 12/2018 | |
| EP | 0107151 A1 | 5/1984 | |
| EP | 1788169 A1 | 5/2007 | |
| EP | 2677098 A1 * | 12/2013 | E05B 15/101 |
| EP | 2933415 A1 | 10/2015 | |
| EP | 3550528 A1 | 9/2019 | |
| EP | 3805490 A1 | 4/2021 | |
| GB | 2572027 A | 9/2019 | |
| KR | 20210019168 A | 2/2021 | |
| KR | 20210033154 A | 3/2021 | |
| WO | 8800633 A1 | 1/1988 | |
| WO | 2021007588 A1 | 1/2021 | |
| WO | 2021050616 A1 | 3/2021 | |
| WO | 2021214134 A1 | 10/2021 | |
| WO | 2022063950 A1 | 3/2022 | |
| WO | 2022063952 A1 | 3/2022 | |
| WO | 2023036744 A1 | 3/2023 | |

* cited by examiner

HEAVY DUTY LOCK

BACKGROUND OF THE INVENTION

The present invention relates to a heavy duty lock and, more particularly, to a heavy duty lock including an anti-theft latch which can automatically move to an extended, anti-theft position and which can retract to a non-anti-theft position while moving a latch to a retracted, unlatching position through operation of a door.

A lock case currently available on the market can be mounted inside a door and includes a latch and an anti-theft latch which can operate separately from the latch. The latch is coupled with a latch hole in a door frame around the door in a closed position, preventing opening of the door. The lock case is operatively connected to inner and outer operating devices which are mounted on two sides of the door. When the anti-theft latch is in a retracted, non-anti-theft position, the inner and outer operating devices can actuate the latch to move to a retracted, unlatching position permitting opening of the door. The anti-theft latch can be moved to an anti-theft position engaged with an anti-theft hole of the door frame through additional operation. When the anti-theft latch is in the anti-theft position, even if the inner and outer operating devices are used to move the latch to the unlatching position, the door is still restricted by the anti-theft latch and, thus, cannot be opened. In this case, even though a person at the indoor side intends to open the door, the person must move the anti-theft latch to the non-anti-theft position and operate the inner operating device to move the latch to the unlatching position for opening the door, causing inconvenience in use.

Furthermore, after the door is closed, separate operation for moving the anti-theft latch to the anti-theft position is required when it is desired to achieve a complete anti-theft function, which is not convenient.

BRIEF SUMMARY OF THE INVENTION

To overcome the above drawback, in an aspect, the present invention provides a heavy duty lock comprising:

a case body;

a latch movably coupled to the case body and movable between a latching position and an unlatching position;

an anti-theft latch movably coupled to the case body and movable between an anti-theft position and a non-anti-theft position;

a connecting member pivotably connected to the case body and operatively connected to the latch, wherein pivotal movement of the connecting member actuates the latch to move between the latching position and the unlatching position, and wherein the connecting member includes an unlocking arm; and an anti-theft control member pivotably connected to the case body, wherein the anti-theft control member includes a first push end operatively connected to the anti-theft latch, wherein the anti-theft control member further includes an abutting end adjacent to the unlocking arm, wherein when the anti-theft latch is in the anti-theft position and the connecting member pivots to move the latch from the latching position toward the unlatching position, the unlocking arm presses against the abutting end to pivot the anti-theft control member and to move the anti-theft latch from the anti-theft position to the non-anti-theft position, and wherein when the latch is actuated by the connecting member to the unlatching position, the anti-theft latch is in the non-anti-theft position.

When the connecting member of the heavy duty lock according to the present invention is pivoted through normal operating procedures to move the latch from the latching position to the unlatching position, the connecting member will actuate the anti-theft latch to move from the anti-theft position to the non-anti-theft position.

In an example, the heavy duty lock further comprises:

a stop rod pivotably connected to the case body, wherein the stop rod includes a stop end, wherein the anti-theft latch further includes an extension portion having a stop side, wherein the stop end abuts the extension portion, and wherein when the anti-theft latch displaces, the stop side actuates the stop end to pivot the stop rod; and a stop-latch movably coupled to the case body, wherein the stop-latch includes a stop arm, wherein the stop-latch is movable between an extended position and a retracted position, wherein when the anti-theft latch is in the non-anti-theft position and the stop-latch is in the extended position, the stop arm abuts the stop end of the stop rod to prevent pivotal movement of the stop rod, thereby preventing the anti-theft latch from moving from the non-anti-theft position to the anti-theft position, wherein when the anti-theft latch is in the non-anti-theft position and the stop-latch moves to the retracted position, the stop arm is spaced from the stop end of the stop rod, the anti-theft latch moves from the non-anti-theft position to the anti-theft position, and wherein when the anti-theft latch is in the anti-theft position, the stop arm is stopped by the stop end of the stop rod to prevent the stop-latch from returning to the extended position.

When the door pivots from the open position to the closed position and the stop-latch reaches the retracted position, the stop rod can pivot to enable the anti-theft control member to actuate the anti-theft latch, thereby moving jointly from the non-anti-theft position to the anti-theft position.

In an example, the heavy duty lock further comprises a locking spring. The anti-theft control member further includes a push arm spaced from the first push end. An end of the locking spring is coupled to the case body. Another end of the locking spring is coupled to the push arm. The locking spring is capable of pivoting the anti-theft control member and moving the anti-theft latch from the non-anti-theft position to the anti-theft position only when the stop-latch is located in the retracted position.

In an example, the heavy duty lock further comprises:

an interlocking member coupled with the latch to move therewith, wherein the interlocking member includes a second actuating portion;

an unlatching rod pivotably connected to the case body, wherein the unlatching rod includes a first push portion and a second push portion spaced from the first push portion, and wherein the second push portion abuts the second actuating portion; and a locking operation device mounted to the case body, wherein the locking operation device includes a pivotable push block, wherein the anti-theft control member further includes a second push end spaced from the first push end, wherein when the anti-theft latch is in the anti-theft position, rotation of the push block presses against the first push portion and the second push end to thereby pivot the unlatching rod and the anti-theft control member, wherein with the connecting member remained unmoved, the second push portion of the unlatching rod presses against the second actuating portion, such that the interlocking member actuates the latch to move from the latching position to the unlatching position, whereas the anti-theft control member actuates the anti-theft latch to move from the anti-theft position to the non-anti-theft position.

The lock operating device cooperates with the unlatching rod and the first unit of the anti-theft control member to directly actuate the latch to move from the latching position to the unlatching position while moving the anti-theft latch from the anti-theft position to the non-anti-theft position.

In an example, the heavy duty lock further comprises a retaining spring. The anti-theft control member further includes a first unit pivotably connected to the case body and a second unit pivotably connected to the first unit. The first unit includes the first push end, the second push end, and the push arm. The second unit includes a connecting end and an abutting end spaced from the connecting end. The connecting end is pivotably connected to the push arm. An end of the retaining spring is coupled with the second unit. Another end of the retaining spring abuts the case body. The retaining spring biases the second unit to remain in alignment with the unlocking arm. When the connecting member pivots, the unlocking arm presses against the abutting end.

In an example, the heavy duty lock further comprises a locking operation device mounted to the case body. The locking operation device includes a pivotable push block. The anti-theft control member further includes a second push end spaced from the first push end. When the anti-theft latch is in the anti-theft position, rotation of the push block presses against the second push end to thereby pivot the anti-theft control member, and the anti-theft control member actuates the anti-theft latch to move from the anti-theft position to the non-anti-theft position.

In an example, the heavy duty lock further comprises:

an interlocking member coupled with the latch to move therewith, wherein the interlocking member includes a second actuating portion; and an unlatching rod pivotably connected to the case body, wherein the unlatching rod includes a first push portion and a second push portion spaced from the first push portion, wherein the second push portion abuts the second actuating portion, wherein when the anti-theft latch is in the anti-theft position, rotation of the push block presses against the second push end and the second push portion to thereby pivot the unlatching rod and the anti-theft control member, and the second push portion presses against the second actuating portion, wherein with the connecting member remained unmoved, the interlocking member actuates the latch to move from the latching position to the unlatching position, and the anti-theft control member actuates the anti-theft latch to move from the anti-theft position to the non-anti-theft position.

In an example, the heavy duty lock further comprises:

an interlocking member coupled with the latch to move therewith, wherein the interlocking member includes a first actuating portion, wherein the connecting member further includes a push end abutting the first actuating member, wherein when the connecting member pivots, the push end actuates the interlocking member to thereby move the latch from the latching position to the unlatching position; and a biasing spring disposed between the interlocking member and the case body, wherein the biasing spring biases the interlocking member to thereby bias the latch to the latching position.

In an example, the anti-theft latch further includes an extension portion having a push track. The push track includes a retaining section at a distal end thereof. An extending direction of the retaining section is substantially perpendicular to a movement direction of the anti-theft latch. The push track is slant except for the retaining section. The first push end is slidably coupled with the push track. When the anti-theft latch is in the non-anti-theft position, the first push end is outside of the retaining section. When the anti-theft latch is in the anti-theft position, the first push end is located in the retaining section.

The retaining section of the push track of the anti-theft latch cooperates with the first push end of the anti-theft control member, such that when the anti-theft latch moves to the anti-theft position, the latch heads cannot be picked via the gap between the door and the door frame. Thus, the anti-theft latch cannot move to the non-anti-theft position. Therefore, the heavy duty lock according to the present invention provides excellent anti-theft effect.

In another aspect, the present invention provides a heavy duty lock comprising:

a case body;

a latch movably coupled to the case body and movable between a latching position and an unlatching position;

an anti-theft latch movably coupled to the case body and movable between an anti-theft position and a non-anti-theft position;

a connecting member pivotably connected to the case body, wherein pivotal movement of the connecting member causes movement of the latch between the latching position and the unlatching position;

an anti-theft control member pivotably connected to the case body, wherein the anti-theft control member includes a first push end operatively connected to the anti-theft latch and a push arm, and wherein when the anti-theft control member pivots, the first push end actuates the anti-theft latch to displace;

a locking spring including an end coupled to the case body and another end coupled to the push arm;

a stop rod pivotably connected to the case body, wherein displacement of the anti-theft latch causes rotation of the stop rod; and a stop-latch movably coupled to the case body, wherein the stop-latch is movable between an extended position and a retracted position, wherein when the anti-theft latch is in the non-anti-theft position and the stop-latch is in the extended position, pivotal movement of the stop rod is prevented to thereby prevent the anti-theft latch from moving from the non-anti-theft position to the anti-theft position, wherein when the anti-theft latch is in the non-anti-theft position and the stop-latch moves to the retracted position, the stop rod is pivotable, the locking spring actuates the push arm to pivot the anti-theft control member, and the anti-theft control member actuates the anti-theft latch to move from the non-anti-theft position to the anti-theft position, and wherein when the anti-theft latch is in the anti-theft position, the stop-latch is prevented from moving to the extended position.

When the door pivots from the open position to the closed position and the stop-latch reaches the retracted position, the stop rod can pivot to enable the anti-theft control member to actuate the anti-theft latch, thereby moving jointly from the non-anti-theft position to the anti-theft position.

In an example, the heavy duty lock further comprises a locking operation device mounted to the case body. The locking operation device includes a pivotable push block. The anti-theft control member further includes a second push end spaced from the first push end. The anti-theft latch further includes an extension portion having a stop side. The stop rod includes a stop end abutting the extension portion. The stop-latch includes a stop arm. When the stop-latch is in the extended position, the stop arm abuts the stop end to prevent rotation of the stop rod. When the stop-latch is in the retracted position, the stop arm is spaced from the stop end to permit rotation of the stop rod. When the anti-theft latch is in the anti-theft position, rotation of the push block presses against the second push end, such that the anti-theft control member pivots and actuates the anti-theft latch to move from the anti-theft position to the non-anti-theft position.

In an example, the heavy duty lock further comprises:

an interlocking member coupled with the latch to move therewith, wherein the interlocking member includes a second actuating portion; and an unlatching rod pivotably connected to the case body, wherein the unlatching rod includes a first push portion and a second push portion spaced from the first push portion, wherein the second push portion abuts the second actuating portion, wherein rotation of the push block presses against the first push portion and the second push end to thereby pivot the unlatching rod and the anti-theft control member, and the second push portion presses against the second actuating portion, wherein with the connecting member remained unmoved, the interlocking member actuates the latch to move from the latching position to the unlatching position, and the anti-theft latch is actuated to move from the anti-theft position to the non-anti-theft position.

In an example, the heavy duty lock further comprises:

an interlocking member coupled with the latch to move therewith, wherein the interlocking member includes a second actuating portion;

an unlatching rod pivotably connected to the case body, wherein the unlatching rod includes a first push portion and a second push portion spaced from the first push portion, and wherein the second push portion abuts the second actuating portion; and a locking operation device mounted to the case body, wherein the locking operation device includes a pivotable push block which is operatively connected to the anti-theft latch, wherein when the anti-theft latch is in the anti-theft position, rotation of the push block presses against the first push portion to thereby pivot the unlatching rod, and the second push portion presses against the second actuating portion, wherein with the connecting member remained unmoved, the interlocking member actuates the latch to move from the latching position to the unlatching position, and the anti-theft latch is actuated to move from the anti-theft position to the non-anti-theft position.

In an example, the heavy duty lock further comprises:

an interlocking member coupled with the latch to move therewith, wherein the interlocking member includes a first actuating portion, wherein the connecting member further includes a push end abutting the first actuating member, and wherein when the connecting member pivots, the push end actuates the interlocking member to thereby move the latch from the latching position to the unlatching position; and a biasing spring disposed between the interlocking member and the case body, wherein the biasing spring biases the interlocking member to thereby bias the latch to the latching position.

In an example, the extension portion has a push track. The push track includes a retaining section at a distal end thereof. An extending direction of the retaining section is substantially perpendicular to a movement direction of the anti-theft latch. The push track is slant except for the retaining section. The first push end is slidably coupled with the push track. When the anti-theft latch is in the non-anti-theft position, the first push end is outside of the retaining section. When the anti-theft latch is in the anti-theft position, the first push end is located in the retaining section.

The present invention will become clearer in light of the following detailed description of illustrative embodiments of this invention described in connection with the drawings.

Figure 1:
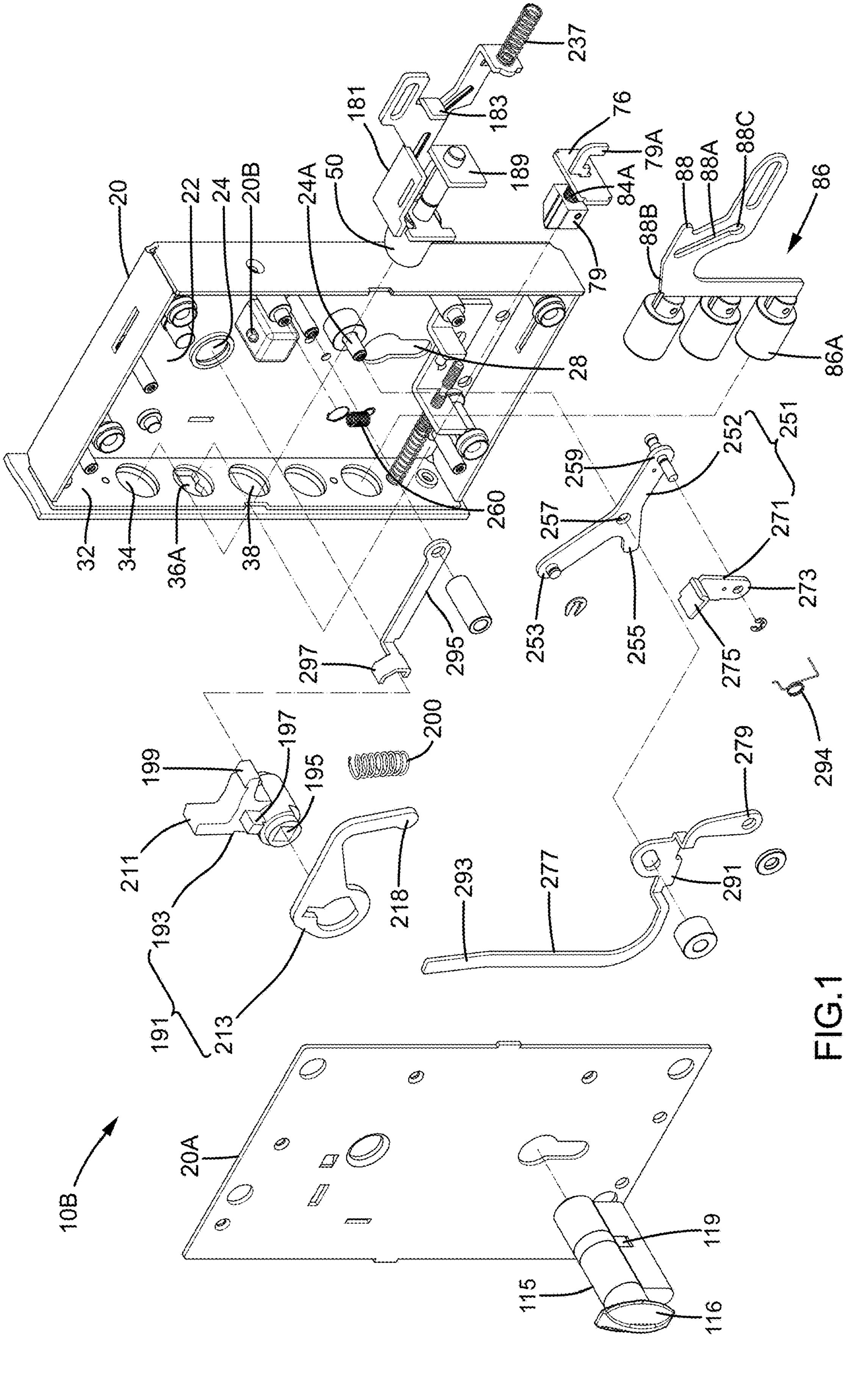
FIG. 1 is an exploded, perspective view of a heavy duty lock of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "inner", "outer", "side", "end", "portion", "section", "axial", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
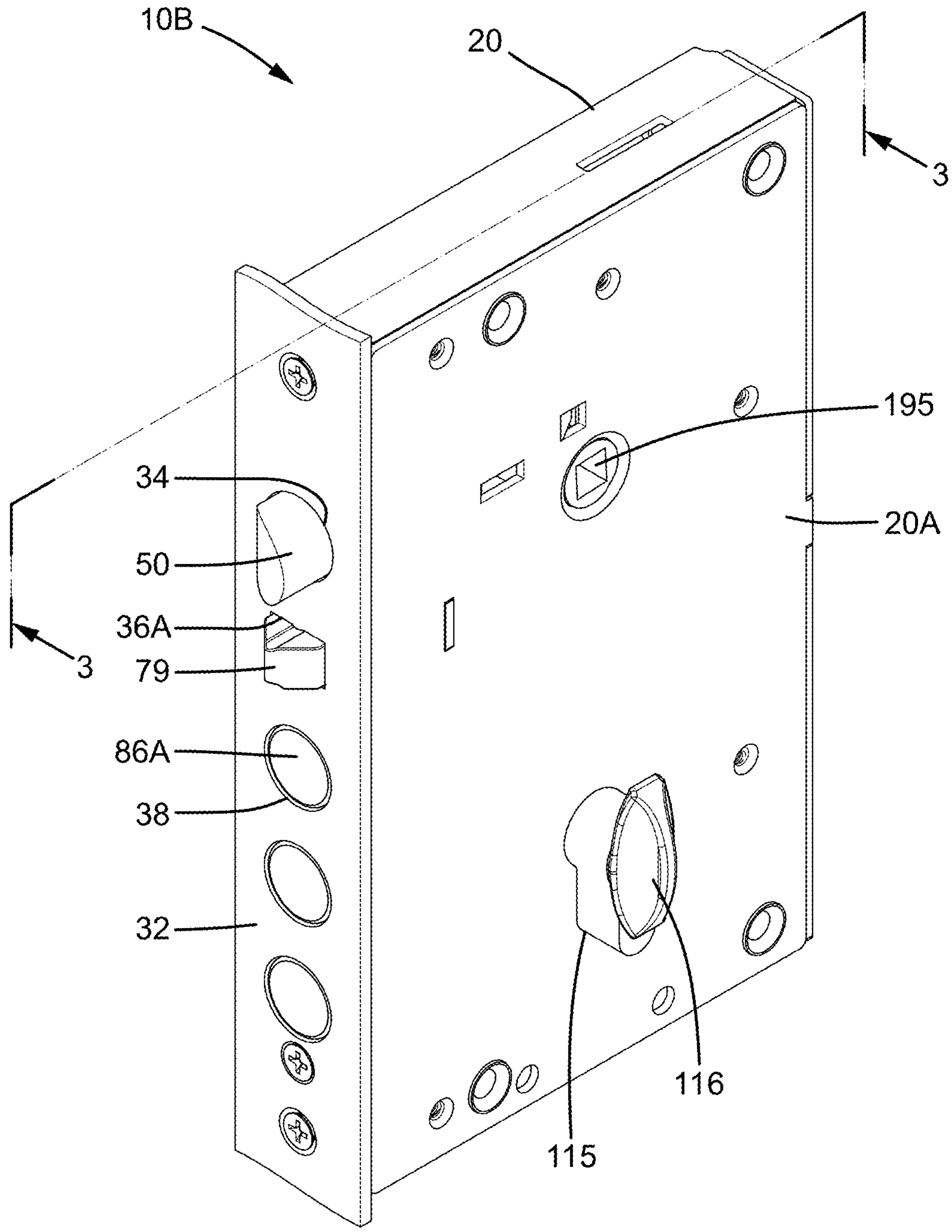
FIG. 2 is a perspective view of the heavy duty lock of FIG. 1 after assembly.
Figure 3:
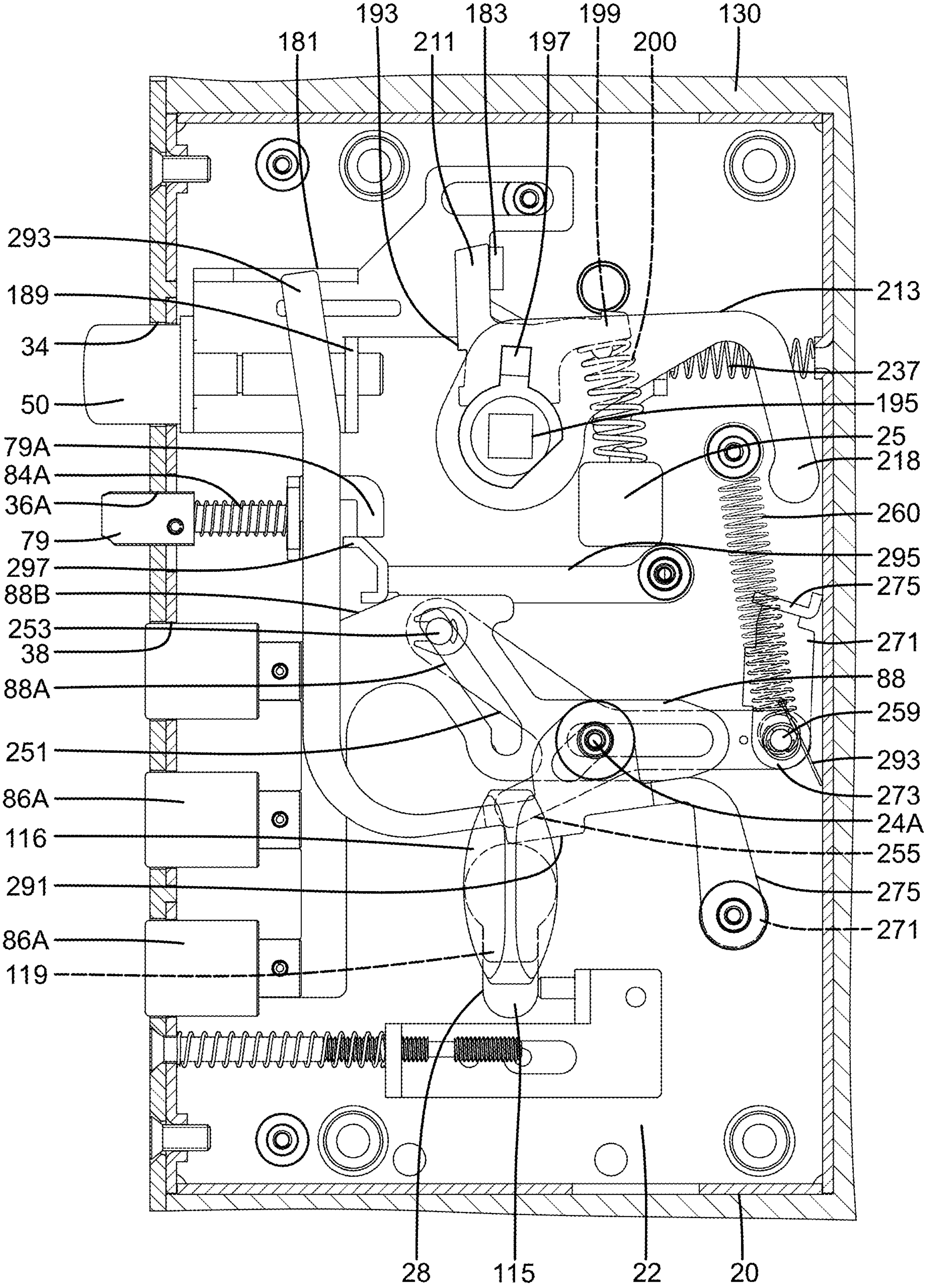
FIG. 3 is a cross sectional view taken along section line 3-3 of FIG. 2.

The present invention relates to a heavy duty lock 10B which can be mounted in a door 130 to retain the door 130 in a closed position and which has a strength better than an ordinary lock. With reference to FIGS. 1-3, the heavy duty lock 10B includes a case body 20 having a bottom wall 22, an end plate 32 extending perpendicularly to the bottom wall 22, and a lid 20A opposite to the bottom wall 22. First and second pivotal portions 24 and 24A are formed on the bottom wall 22 and spaced from each other. The first pivotal portion 24 can be in the form of a cylindrical hole, and the second pivotal portion 24A can be in the form of a cylinder. A lock core hole 28 is formed on the bottom wall 22 of the case body 20. The case body 20 further includes a supporting portion 20B securely disposed on the bottom wall 20.

The end plate 32 includes a latch hole 34, a stop-latch hole 36A, and a plurality of anti-theft latch holes 38. The stop-latch hole 36A is located between the latch hole 34 and the plurality of anti-theft latch holes 38.

The heavy duty lock 10B further includes a latch 50 slidably mounted to the case body 20. The latch 50 includes an interlocking member 181. The interlocking member 181 includes a first actuating portion 183 and a second actuating portion 189. The first actuating portion 183 is closer to the end plate 32 than the second actuating portion 189 in a direction parallel to the movement direction of the latch 50.

Figure 4:
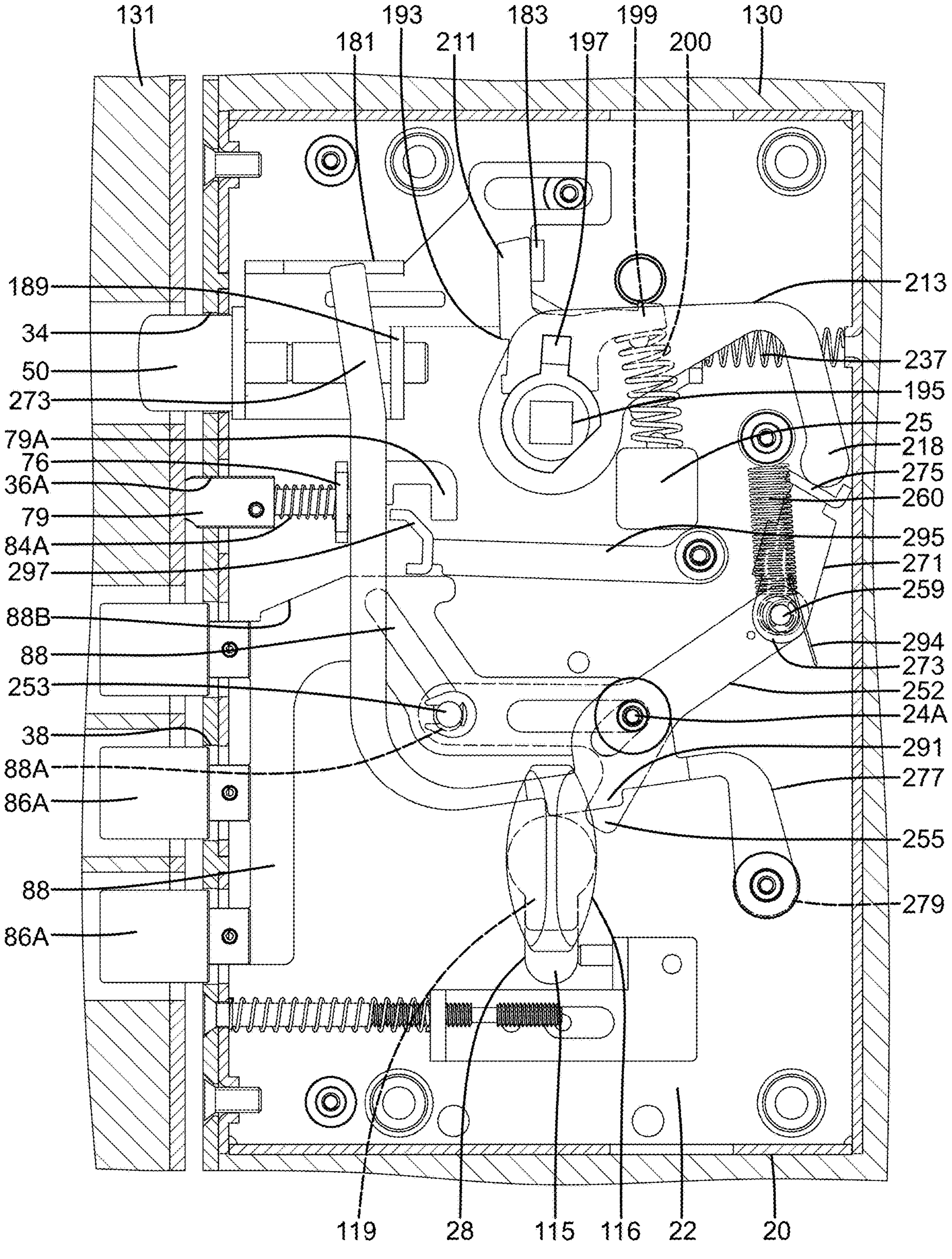
FIG. 4 is a cross sectional view of the heavy duty lock mounted in a door, with the door in a closed position and with an anti-theft latch in an anti-theft position.
Figure 5:
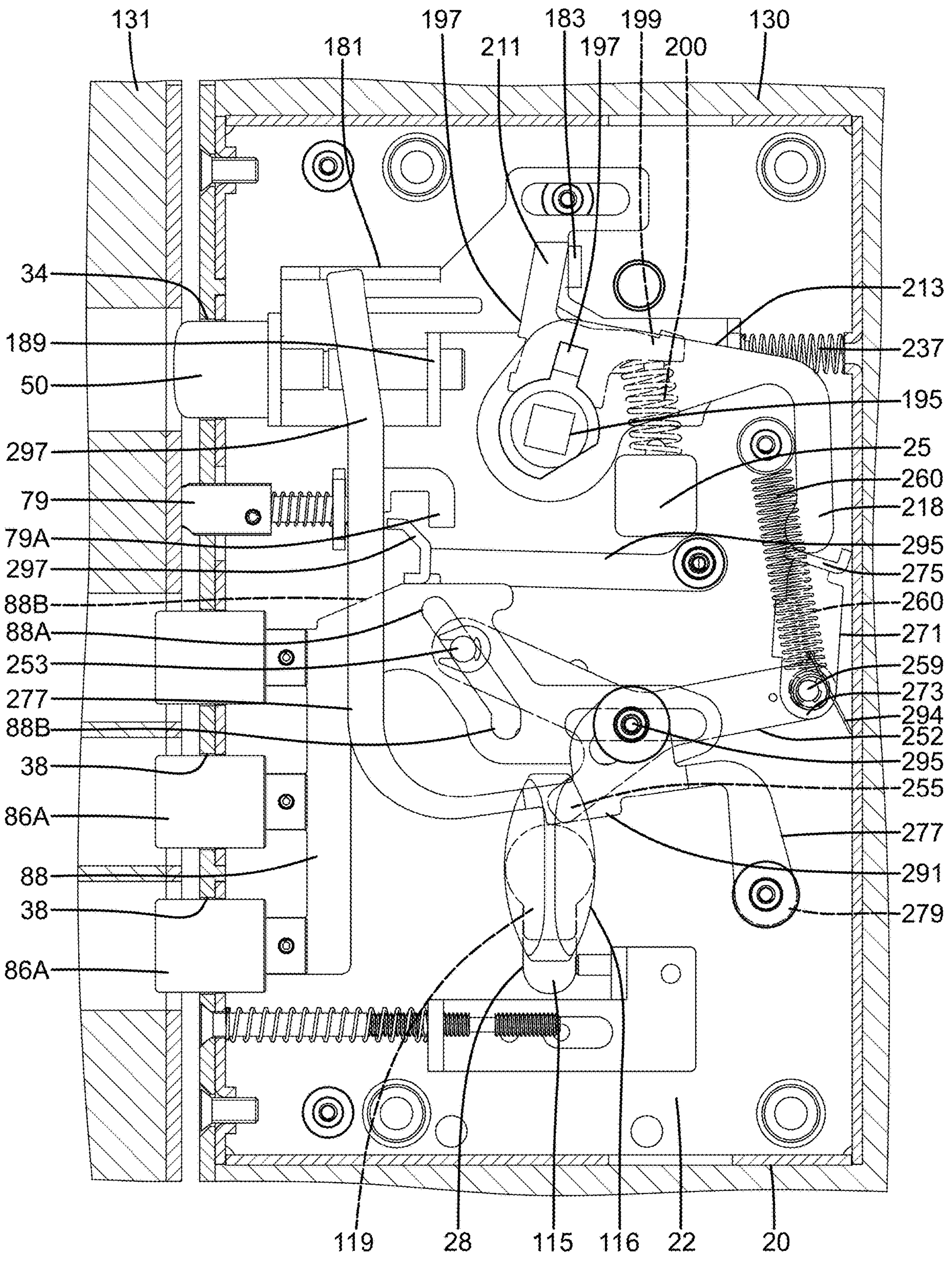
FIG. 5 is a cross sectional view similar to FIG. 4 with either of an outer operating device and an inner operating device operated to move a latch to an unlatching position and to move the anti-theft latch to a non-anti-theft position.
Figure 6:
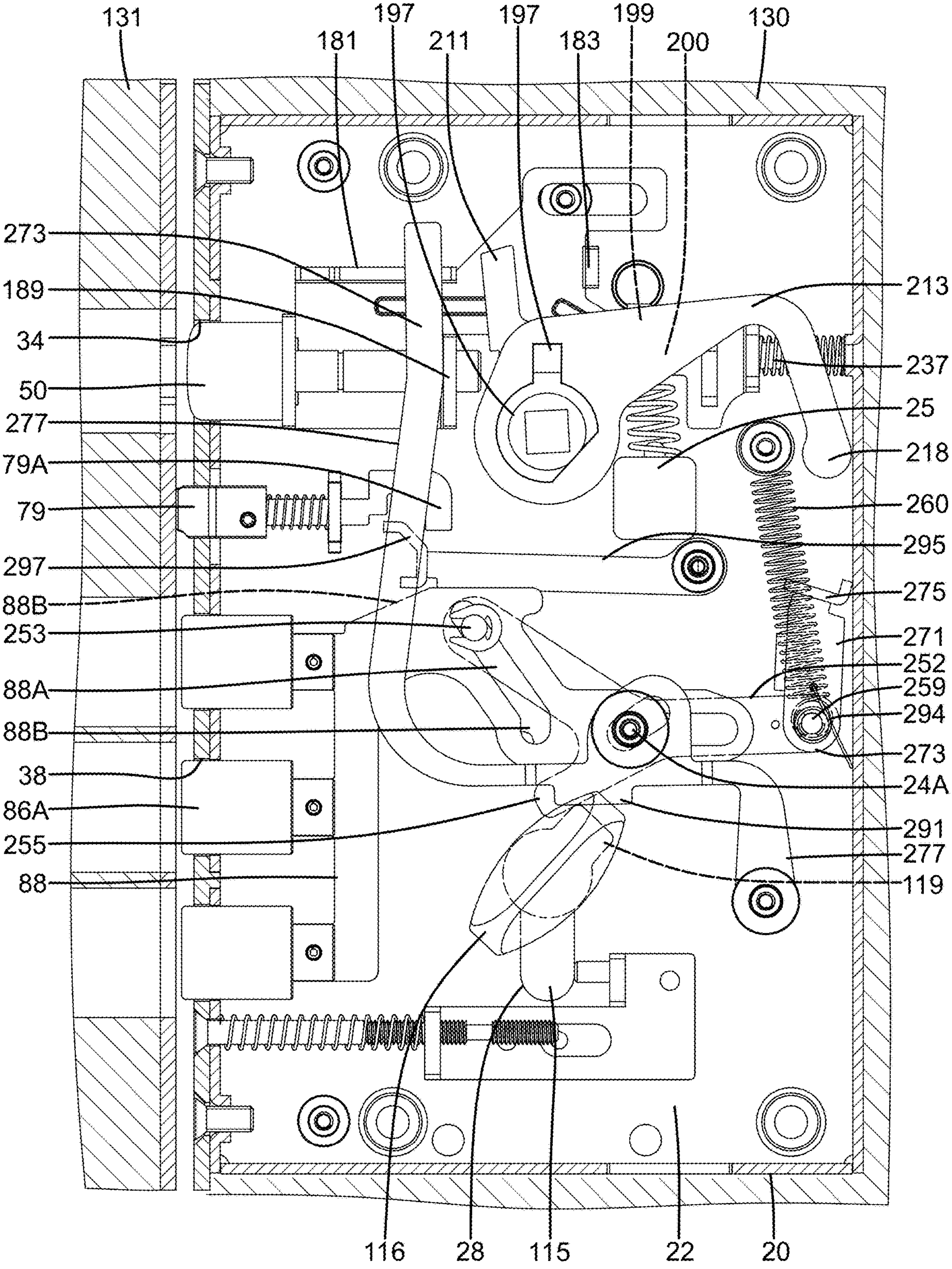
FIG. 6 is a cross sectional view similar to FIG. 5 with a locking operation device operated to actuate an unlatching rod and an anti-theft control member to thereby move the latch to the unlatching position and to move the anti-theft latch to the anti-theft position.

An outer end of the latch 50 slidably extends through the latch hole 34 of the case body 20, such that the latch 50 is movable in an axial direction of the latch hole 34 between a latching position (FIGS. 3 and 4) and an unlatching position (FIGS. 5 and 6). The extent of the latch 50 in the latching position protruding beyond the end plate 32 is greater than that of the latch 50 in the unlatching position protruding beyond the end plate 32. Furthermore, a biasing spring 237 is disposed between a tail end of the interlocking member 181 and the case body 20 to bias the latch 50 towards the latching position.

The heavy duty lock 10B further includes a connecting member 191 pivotably connected to the case body 20. The connecting member 191 includes a first portion 193 and a second portion 213 which pivots together with the first portion 193. The first portion 193 may, but not limited to, be formed by powder metallurgy. The first portion 193 includes an extension arm 199 and a push end 211. The extension arm 199 and the push end 211 are spaced from each other in a circumferential direction about a pivotal axis of the first portion 193. The first portion 193 further includes a coupling portion 197 extending from a side thereof and a connecting hole 195 extending through the first portion 193 along the pivotal axis of the connecting member 191.

The second portion 213 includes an unlocking arm 218 which is substantially inverted L-shaped and distant to the end plate 32. The second portion 213 is coupled with the coupling portion 197 of the first portion 193 to allow joint pivotal movement of the first portion 193 and the second portion 213.

The first portion 193 of the connecting member 191 is pivotably connected to the first pivotal portion 24 of the case body 20. A return spring 200 is disposed between the extension arm 199 and the supporting portion 20B. The push end 211 abuts the first actuating portion 183 of the interlocking member 181. Thus, when the connecting member 191 pivots, the return spring 200 is compressed, and the push end 211 presses against the first actuating portion 183 of the interlocking member 81 to actuate the latch 50 to move between the latching position and the unlatching position.

The heavy duty lock 10B further includes a stop-latch 79 slidably coupled to the case body 20 and a supporting member 76. The supporting member 76 can be in the form of a piece fixed on the bottom wall 22 of the case body 20. The stop-latch 79 includes a stop arm 79A located inside the case body 20. The stop arm 79A is substantially L-shaped and extends downward. The stop-latch 79 slidably extends through the stop-latch hole 36A. The stop-latch 79 is movable between an extended position (FIG. 3) and a retracted position (FIGS. 4-6) in an axial direction of the stop-latch hole 36A. An extent of the stop-latch 79 in the extended position protruding beyond the end plate 32 is greater than that of the stop-latch 79 in the retracted position protruding beyond the end plate 32. A spring 84A is disposed between the stop-latch 79 and the supporting member 76 and biases the stop-latch 79 towards the extended position.

The heavy duty lock 10B further includes an anti-theft control member 251 pivotably connected to the case body 20. The anti-theft control member 251 includes a first unit 252 and a second unit 271. The first unit 252 includes a first push end 253 and a second push end 255 spaced from the first push end 253. The first unit 252 further includes a push arm 259 located between the first push end 253 and the second push end 255 in a circumferential direction about a pivotal axis of the anti-theft control member 251. The first unit 252 further includes a pivotal portion 257 located between the first push end 253 and the push arm 259.

The second unit 271 includes a connecting end 273 and an abutting end 275 which is spaced from the connecting end 273 and which includes a flat face. The pivotal portion 257 of the first unit 252 is pivotably connected to the second pivotal portion 24A of the case body 20. The second push end 255 is adjacent to the lock core hole 28. The connecting end 273 of the second unit 271 is pivotably connected to the push arm 259 of the first unit 251.

A retaining spring 294 is disposed between the case body 20 and the second unit 271. An end of the retaining spring 294 may abut the case body 20. Another end of the retaining spring 294 is coupled with the second unit 271. Thus, the retaining member 294 may bias the abutting end 275 of the second unit 271 to abut against the case body 20 and, thus, be retained in a position aligned with the unlocking arm 218, as shown in FIG. 3.

The heavy duty lock 10B further includes an anti-theft latch 86 movably coupled to the case body 20. The anti-theft latch 86 includes an extension portion 88 and a plurality of latch heads 86A extending from the extension portion 88. The extension portion 88 includes a push track 88A (which is slant) and a stop side 88B spaced from the push track 88A. The push track 88A includes a retaining section 88C at a distal end thereof. The retaining section 88C is substantially perpendicular to the movement direction of the anti-theft latch 86. In a non-restrictive example, the stop side 88B may include a horizontal section parallel to the movement direction of the anti-theft latch 86 and a slant section at a slant angle relative to the horizontal section. A locking spring 260 is disposed between the case body 20 and the push arm 259 of the anti-theft control member 251. The locking spring 260 imparts a pulling force to the push arm 259 of the anti-theft control member 251, such that the anti-theft control member 251 generates a torque which pushes the anti-theft latch 86 towards an anti-theft position.

The anti-theft latch 86 is slidably coupled with the plurality of anti-theft latch holes 38. The anti-theft latch 86 is movable between the anti-theft position (FIG. 4) and a non-anti-theft position (FIG. 3). The first push end 253 of the anti-theft control member 251 is slidably coupled with the push track 88A of the anti-theft latch 86. Thus, when the anti-theft control member 251 pivots, the first push end 253 pushes the anti-theft latch 86 to move to the anti-theft position or the non-anti-theft position.

The heavy duty lock 10B further includes an unlatching rod 277 which may be but not limited to L-shaped. The unlatching rod 277 is pivotably received in the case body 20 and includes a first push portion 291, a second push portion 293, and an engaging portion 279. The first push portion 291 is located between the second push portion 293 and the engaging portion 279.

The engaging portion 279 of the unlatching rod 277 is pivotably coupled with the case body 20. The first push portion 291 is adjacent to the lock core hole 28 and abuts the second push end 255. The second push portion 293 abuts the second actuating portion 189 of the interlocking member 181. Thus, when the unlatching rod 277 pivots, the second push portion 293 pushes the second actuating portion 189 to thereby move the latch 50 from the latching position to the unlatching position.

The heavy duty lock 10B further includes a locking operation device 115 having a pivotable push block 119. The locking operation device 115 further includes a knob 116 interlocked with the push block 119 and a lock core (not shown) received therein. The knob 116 can be actuated to drive the push block 119 to pivot. The push block 119 can be pivoted only after a key is used to unlock the lock core.

The locking operation device 115 is coupled with the lock core hole 28 of the case body 20. The knob 116 is located on an indoor side. The lock core is located on an outdoor side. The push block 119 is aligned with the second push end 255 of the anti-theft control member 251 and the first push portion 291 of the unlatching rod 277 in the axial direction of the lock core hole 28.

The heavy duty lock 10B is mounted to an inner side of the door 130 pivotably mounted in a door frame 131, permitting the door 130 to pivot relative to the frame 131 to an open position and the closed position. Although not specifically shown, the heavy duty lock 10B according to the present invention may be used together with a currently available electronic type inner operating device and a currently available electronic type outer operating device in electrical connection with the inner operating device. The inner and outer operating devices are operatively coupled with the connecting hole 195 of the connecting member 191. Furthermore, when the outer operating device is set to a locking state, a handle of the outer operating device rotates idly, such that the outer operating device cannot drive the connecting member 191 of the heavy duty lock 10B to pivot and, thus, cannot move the latch 50 to the unlatching position. Therefore, before the outer operating device is unlocked, the door 130 cannot be opened from the outside by the outer operating device.

The heavy duty lock 10B further comprises a stop rod 295 pivotably connected to the case body 20. The stop rod 295 includes a stop end 297. With reference to FIG. 3, the stop end 297 of the stop rod 295 abuts the stop side 88B of the anti-theft latch 86. Furthermore, the stop end 297 is located between the stop arm 79A of the stop-latch 79 and the stop side 88B of the anti-theft latch 86. Thus, when the anti-theft latch 86 displaces, the stop side 88B will actuate the stop end 297 to thereby cause pivotal movement of the stop rod 295.

Now that the basic construction of the heavy duty lock 10B of the present invention has been explained, the operation and some of the advantages of the heavy duty lock 10B can be set forth and appreciated. In particular, for the sake of explanation, it will be assumed that the door 130 is in an open position (not closed, see FIG. 3), and the latch 50 is in the latching position. Furthermore, the anti-theft latch 86 is in the non-anti-theft position, the stop-latch 79 is in the extended position. The push end 211 of the connecting member 191 abuts the first actuating portion 183 of the latch 50. In this state, the lower side of the stop end 297 of the stop rod 295 abuts the slant section of the stop side 88B. The abutting end 275 of the anti-theft control member 251 is spaced from the unlocking arm 218 of the connecting member 191. The upper side of the stop end 297 is restricted by the stop arm 79A of the stop-latch 79 to prevent rotation of the stop rod 295. Thus, the path permitting movement of the anti-theft latch 86 toward the anti-theft position is blocked by the stop end 297 of the stop rod 295. As a result, the anti-theft latch 86 cannot move from the non-anti-theft position to the anti-theft position. Accordingly, even though the locking spring 260 biases the anti-theft latch 86 toward the anti-theft position via the anti-theft control member 251, the anti-theft latch 86 still remains in the non-anti-theft position. Furthermore, the first push end 253 of the anti-theft control member 251 is not located in the retaining section 88C.

With reference to FIG. 4, when the door 130 pivots from the open position to a place near the closed position, the latch 50 and the stop-latch 79 is pressed by the door frame 131, and the latch 50 moves from the latching position to the unlatching position. The stop-latch 79 moves from the extended position to the retracted position, such that the stop arm 79A is spaced from the stop end 297. The stop end 295 is released and, thus, becomes pivotable. Then, the locking spring 260 actuates the anti-theft control member 251 to pivot. The first push end 253 actuates the extension portion 88 to move the anti-theft latch 86 from the non-anti-theft position to the anti-theft position. When the anti-theft latch 86 reaches the anti-theft position, the first push end 253 of the anti-theft control member 251 is located in the retaining section 88C, and the abutting end 275 of the anti-theft control member 251 abuts the unlocking arm 218 of the connecting member 191.

When the anti-theft latch 86 is in the anti-theft position, the latch 50 is in the latching position, and the stop-latch 79 remains in the retracted position. Each of the plurality of latch heads 86A and the latch 50 engages with the door frame 131. Thus, when the latch 50 is in the latching position or the anti-theft latch 86 is in the anti-theft position, the door 130 cannot be directly pivoted for opening purposes. Furthermore, since the first push end 253 of the anti-theft control member 251 is in the retaining section 88C, the latch heads 86A of the anti-theft latch 86 cannot be directly picked via the gap between the door 130 and the door frame 131. Therefore, even if the latch 50 is picked via the gap between the door 130 and the door frame 131 and, thus, moves to the unlatching position, the door 130 cannot be pivoted and opened, as the anti-theft latch 86 is retained in the anti-theft position.

Thus, it can be appreciated that when the door 130 pivots from the open position to the closed position, the anti-theft latch 86 of the heavy duty lock 10B according to the present invention will automatically move from the non-anti-theft position to the anti-theft position.

With reference to FIG. 5, in a case that the door 130 is to be opened from the closed state, an inner handle of the inner operating device or an outer handle of the outer operating device (which has been unlocked) is pivoted to cause pivotal movement of the connecting member 191, such that the push end 211 presses against the first actuating member 183 of the interlocking member 181, thereby moving the latch 50 from the latching position to the unlatching position. At the same time, the unlocking arm 218 presses against the abutting end 275 to cause pivotal movement of the anti-theft control member 251. The push arm 259 stretches the locking spring

260 to provide a returning force. The first push end 253 actuates the extension portion 88 to move the anti-theft latch 86 from the anti-theft position to the non-anti-theft position.

When the latch 50 is in the unlatching position and the anti-theft latch 86 is in the non-anti-theft position, the door 130 can be opened through pivoting.

With reference to FIG. 6, in a case that both the inner operating device and the outer operating device are out of electricity or damaged and, thus, cannot be used to operate the heavy duty lock 10B according to the present invention, the lock operating device 115 can be used to operate the heavy duty lock 10B according to the present invention. Specifically, when a person is at the inner side of the door 130 (such as in a room), the knob 116 of the lock operating device 115 is directly turned to operate the heavy duty lock 10B. On the other hand, when a person is at the outer side of the door 130 (outside a room), a key is required to actuate a lock core of the lock operating device 115. In either case, the push block 119 is driven to pivot.

In the embodiment shown in FIG. 6, the knob 116 is turned to pivot the push block 119. The push block 119 simultaneously presses against the second push end 255 of the anti-theft control member 251 and the first push portion 291 of the unlatching rod 277. Thus, when the anti-theft control member 251 pivots, the first push end 253 presses against the extension portion 88 to move the anti-theft latch 86 from the anti-theft position to the non-anti-theft position. At the same time, the unlatching rod 277 pivots, such that the second push portion 293 presses against the second actuating portion 189 of the interlocking member 181. With the connecting member 191 not pivoted, the latch 50 and the connecting member 191 move jointly from the latching position to the unlatching position (the push end 211 is spaced from the first actuating portion 183).

The technical features and related operation of the heavy duty lock 10B of the present invention have been set forth. It can be appreciated that when the connecting member 191 of the heavy duty lock 10B according to the present invention is pivoted through normal operating procedures to move the latch 50 from the latching position to the unlatching position, the connecting member 191 will actuate the anti-theft latch 86 to move from the anti-theft position to the non-anti-theft position.

Furthermore, when the door 130 pivots from the open position to the closed position and the stop-latch 79 reaches the retracted position, the stop rod 295 can pivot to enable the anti-theft control member 251 to actuate the anti-theft latch 86, thereby moving jointly from the non-anti-theft position to the anti-theft position.

Furthermore, when the door 130 is in the open position and the anti-theft latch 86 is in the non-anti-theft position, the stop-latch 79 is in the extended position, and the stop rod 295 cannot pivot, such that the anti-theft latch 86 will not move to the anti-theft position. This assures that when the door 130 in the open position, the anti-theft latch 86 will not move to the anti-theft position. As a result, pivotal movement of the door 130 toward the closed position will not cause the latch heads 86A of the anti-theft latch 86 to impact the door frame 131.

The retaining section 88C of the push track 88A of the anti-theft latch 86 cooperates with the first push end 253 of the anti-theft control member 251, such that when the anti-theft latch 86 moves to the anti-theft position, the latch heads 86A cannot be picked via the gap between the door 130 and the door frame 131. Thus, the anti-theft latch 86 cannot move to the non-anti-theft position. Therefore, the heavy duty lock 10B according to the present invention provides excellent anti-theft effect.

The lock operating device 115 cooperates with the unlatching rod 277 and the first unit 252 of the anti-theft control member 251 to directly actuate the latch 50 to move from the latching position to the unlatching position while moving the anti-theft latch 86 from the anti-theft position to the non-anti-theft position.

Now that the basic teachings of the present invention have been explained, many extensions and variations will be obvious to one having ordinary skill in the art. For example, the heavy duty lock 10B does not have to include the unlocking arm 218. In this case, although pivotal movement of the connecting member 191 cannot move the anti-theft latch 86 to the non-anti-theft position, the lock operating device 115 can still be used to move the anti-theft latch 86 to the anti-theft position.

Furthermore, the heavy duty lock 10B according to the present invention does not have to include the unlatching rod 277 and the lock operating device 115. In this case, the connecting member 191 can still be pivoted through the outer operating device and the inner operating device to move the latch 50 from the latching position to the unlatching position while moving the anti-theft latch 86 from the anti-theft position to the non-anti-theft position.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A heavy duty lock comprising:

a case body;

a latch movably coupled to the case body and movable between a latching position and an unlatching position;

an anti-theft latch movably coupled to the case body and movable between an anti-theft position and a non-anti-theft position;

a connecting member pivotably connected to the case body and operatively connected to the latch, wherein pivotal movement of the connecting member actuates the latch to move between the latching position and the unlatching position, and wherein the connecting member includes an unlocking arm;

an anti-theft control member pivotably connected to the case body, wherein the anti-theft control member includes a first push end operatively connected to the anti-theft latch, wherein the anti-theft control member further includes an abutting end adjacent to the unlocking arm, wherein when the anti-theft latch is in the anti-theft position and the connecting member pivots to move the latch from the latching position toward the unlatching position, the unlocking arm presses against the abutting end to pivot the anti-theft control member and to move the anti-theft latch from the anti-theft position to the non-anti-theft position, and wherein when the latch is actuated by the connecting member to the unlatching position, the anti-theft latch is in the non-anti-theft position, an interlocking member coupled with the latch to move therewith, wherein the interlocking member includes a first actuating portion, wherein the connecting member further includes a push end abutting the first actuating member, wherein when the interlocking member pivots, the push end actuates the interlocking member to thereby move the latch from the latching position to the unlatching position; and a biasing spring disposed between the interlocking member and the case body, wherein the biasing spring biases the interlocking member to thereby bias the latch to the latching position.

2. The heavy duty lock as claimed in claim 1, further comprising:

a stop rod pivotably connected to the case body, wherein the stop rod includes a stop end, wherein the anti-theft latch further includes an extension portion having a stop side, wherein the stop end abuts the extension portion, and wherein when the anti-theft latch displaces, the stop side actuates the stop end to pivot the stop rod; and a stop-latch movably coupled to the case body, wherein the stop-latch includes a stop arm, wherein the stop-latch is movable between an extended position and a retracted position, wherein when the anti-theft latch is in the non-anti-theft position and the stop-latch is in the extended position, the stop arm abuts the stop end of the stop rod to prevent pivotal movement of the stop rod, thereby preventing the anti-theft latch from moving from the non-anti-theft position to the anti-theft position, wherein when the anti-theft latch is in the non-anti-theft position and the stop-latch moves to the retracted position, the stop arm is spaced from the stop end of the stop rod, the anti-theft latch moves from the non-anti-theft position to the anti-theft position, and wherein when the anti-theft latch is in the anti-theft position, the stop arm is stopped by the stop end of the stop rod to prevent the stop-latch from returning to the extended position.

3. The heavy duty lock as claimed in claim 2, further comprising a locking spring, wherein the anti-theft control member further includes a push arm spaced from the first push end, wherein an end of the locking spring is coupled to the case body, wherein another end of the locking spring is coupled to the push arm, wherein the locking spring is capable of pivoting the anti-theft control member and moving the anti-theft latch from the non-anti-theft position to the anti-theft position only when the stop-latch is located in the retracted position.

4. The heavy duty lock as claimed in claim 3, further comprising:

an unlatching rod pivotably connected to the case body, wherein the unlatching rod includes a first push portion and a second push portion spaced from the first push portion, and wherein the second push portion abuts the second actuating portion; and a locking operation device mounted to the case body, wherein the locking operation device includes a pivotable push block, wherein the anti-theft control member further includes a second push end spaced from the first push end, wherein when the anti-theft latch is in the anti-theft position, rotation of the push block presses against the first push portion and the second push end to thereby pivot the unlatching rod and the anti-theft control member, wherein with the connecting member remained unmoved, the second push portion of the unlatching rod presses against the second actuating portion, such that the interlocking member actuates the latch to move from the latching position to the unlatching position, whereas the anti-theft control member actuates the anti-theft latch to move from the anti-theft position to the non-anti-theft position.

5. The heavy duty lock as claimed in claim 4, further comprising a retaining spring, wherein the anti-theft control member further includes a first unit pivotably connected to the case body and a second unit pivotably connected to the first unit, wherein the first unit includes the first push end, the second push end, and the push arm, wherein the second unit includes a connecting end and an abutting end spaced from the connecting end, wherein the connecting end is pivotably connected to the push arm, wherein an end of the retaining spring is coupled with the second unit, wherein another end of the retaining spring abuts the case body, wherein the retaining spring biases the second unit to remain in alignment with the unlocking arm, and wherein when the connecting member pivots, the unlocking arm presses against the abutting end.

6. The heavy duty lock as claimed in claim 1, further comprising a locking operation device mounted to the case body, wherein the locking operation device includes a pivotable push block, wherein the anti-theft control member further includes a second push end spaced from the first push end, wherein when the anti-theft latch is in the anti-theft position, rotation of the push block presses against the second push end to thereby pivot the anti-theft control member, and the anti-theft control member actuates the anti-theft latch to move from the anti-theft position to the non-anti-theft position.

7. The heavy duty lock as claimed in claim 6, further comprising:

an unlatching rod pivotably connected to the case body, wherein the unlatching rod includes a first push portion and a second push portion spaced from the first push portion, wherein the second push portion abuts the second actuating portion, wherein when the anti-theft latch is in the anti-theft position, rotation of the push block presses against the second push end and the second push portion to thereby pivot the unlatching rod and the anti-theft control member, and the second push portion presses against the second actuating portion, wherein with the connecting member remained unmoved, the interlocking member actuates the latch to move from the latching position to the unlatching position, and the anti-theft control member actuates the anti-theft latch to move from the anti-theft position to the non-anti-theft position.

8. The heavy duty lock as claimed in claim 1, wherein the anti-theft latch further includes an extension portion having a push track, wherein the push track includes a retaining section at a distal end thereof, wherein an extending direction of the retaining section is substantially perpendicular to a movement direction of the anti-theft latch, wherein the push track is slant except for the retaining section, wherein the first push end is slidably coupled with the push track, wherein when the anti-theft latch is in the non-anti-theft position, the first push end is outside of the retaining section, and wherein when the anti-theft latch is in the anti-theft position, the first push end is located in the retaining section.

9. A heavy duty lock comprising:

a case body;

a latch movably coupled to the case body and movable between a latching position and an unlatching position;

an anti-theft latch movably coupled to the case body and movable between an anti-theft position and a non-anti-theft position;

a connecting member pivotably connected to the case body, wherein pivotal movement of the connecting member causes movement of the latch between the latching position and the unlatching position;

an anti-theft control member pivotably connected to the case body, wherein the anti-theft control member includes a first push end operatively connected to the anti-theft latch and a push arm, and wherein when the anti-theft control member pivots, the first push end actuates the anti-theft latch to displace;

a locking spring including an end coupled to the case body and another end coupled to the push arm;

a stop rod pivotably connected to the case body, wherein displacement of the anti-theft latch causes rotation of the stop rod;

a stop-latch movably coupled to the case body, wherein the stop-latch is movable between an extended position and a retracted position, wherein when the anti-theft latch is in the non-anti-theft position and the stop-latch is in the extended position, pivotal movement of the stop rod is prevented to thereby prevent the anti-theft latch from moving from the non-anti-theft position to the anti-theft position, wherein when the anti-theft latch is in the non-anti-theft position and the stop-latch moves to the retracted position, the stop rod is pivotable, the locking spring actuates the push arm to pivot the anti-theft control member, and the anti-theft control member actuates the anti-theft latch to move from the non-anti-theft position to the anti-theft position, and wherein when the anti-theft latch is in the anti-theft position, the stop-latch is prevented from moving to the extended position;

a locking operation device mounted to the case body, wherein the locking operation device includes a pivotable push block, wherein the anti-theft control member further includes a second push end spaced from the first push end, wherein the anti-theft latch further includes an extension portion having a stop side, wherein the stop rod includes a stop end abutting the extension portion, wherein the stop-latch includes a stop arm, wherein when the stop-latch is in the extended position, the stop arm abuts the stop end to prevent rotation of the stop rod, wherein when the stop-latch is in the retracted position, the stop arm is spaced from the stop end to permit rotation of the stop rod, wherein when the anti-theft latch is in the anti-theft position, rotation of the push block presses against the second push end, such that the anti-theft control member pivots and actuates the anti-theft latch to move from the anti-theft position to the non-anti-theft position;

an interlocking member coupled with the latch to move therewith, wherein the interlocking member includes a second actuating portion; and an unlatching rod pivotably connected to the case body, wherein the unlatching rod includes a first push portion and a second push portion spaced from the first push portion, wherein the second push portion abuts the second actuating portion, wherein rotation of the push block presses against the first push portion and the second push end to thereby pivot the unlatching rod and the anti-theft control member, and the second push portion presses against the second actuating portion, wherein with the connecting member remained unmoved, the interlocking member actuates the latch to move from the latching position to the unlatching position, and the anti-theft latch is actuated to move from the anti-theft position to the non-anti-theft position.

10. A heavy duty lock comprising:

a case body;

a latch movably coupled to the case body and movable between a latching position and an unlatching position;

an anti-theft latch movably coupled to the case body and movable between an anti-theft position and a non-anti-theft position;

a connecting member pivotably connected to the case body, wherein pivotal movement of the connecting member causes movement of the latch between the latching position and the unlatching position;

an anti-theft control member pivotably connected to the case body, wherein the anti-theft control member includes a first push end operatively connected to the anti-theft latch and a push arm, and wherein when the anti-theft control member pivots, the first push end actuates the anti-theft latch to displace;

a locking spring including an end coupled to the case body and another end coupled to the push arm;

a stop rod pivotably connected to the case body, wherein displacement of the anti-theft latch causes rotation of the stop rod;

a stop-latch movably coupled to the case body, wherein the stop-latch is movable between an extended position and a retracted position, wherein when the anti-theft latch is in the non-anti-theft position and the stop-latch is in the extended position, pivotal movement of the stop rod is prevented to thereby prevent the anti-theft latch from moving from the non-anti-theft position to the anti-theft position, wherein when the anti-theft latch is in the non-anti-theft position and the stop-latch moves to the retracted position, the stop rod is pivotable, the locking spring actuates the push arm to pivot the anti-theft control member, and the anti-theft control member actuates the anti-theft latch to move from the non-anti-theft position to the anti-theft position, and wherein when the anti-theft latch is in the anti-theft position, the stop-latch is prevented from moving to the extended position;

an interlocking member coupled with the latch to move therewith, wherein the interlocking member includes a first actuating portion, wherein the connecting member further includes a push end abutting the first actuating member, and wherein when the interlocking member pivots, the push end actuates the interlocking member to thereby move the latch from the latching position to the unlatching position; and a biasing spring disposed between the interlocking member and the case body, wherein the biasing spring biases the interlocking member to thereby bias the latch to the latching position.

11. The heavy duty lock as claimed in claim 10, further comprising:

an unlatching rod pivotably connected to the case body, wherein the unlatching rod includes a first push portion and a second push portion spaced from the first push portion, and wherein the second push portion abuts the second actuating portion; and a locking operation device mounted to the case body, wherein the locking operation device includes a pivotable push block which is operatively connected to the anti-theft latch, wherein when the anti-theft latch is in the anti-theft position, rotation of the push block presses against the first push portion to thereby pivot the unlatching rod, and the second push portion presses against the second actuating portion, wherein with the connecting member remained unmoved, the interlocking member actuates the latch to move from the latching position to the unlatching position, and the anti-theft latch is actuated to move from the anti-theft position to the non-anti-theft position.

12. The heavy duty lock as claimed in claim 10, wherein the anti-theft latch further includes an extension portion having a push track, wherein the push track includes a retaining section at a distal end thereof, wherein an extending direction of the retaining section is substantially perpendicular to a movement direction of the anti-theft latch, wherein the push track is slant except for the retaining section, wherein the first push end is slidably coupled with the push track, wherein when the anti-theft latch is in the non-anti-theft position, the first push end is outside of the retaining section, and wherein when the anti-theft latch is in the anti-theft position, the first push end is located in the retaining section.

* * * * *